(12) United States Patent
Happy

(10) Patent No.: US 11,465,562 B2
(45) Date of Patent: Oct. 11, 2022

(54) VEHICLE SIDE MIRROR ASSEMBLY

(71) Applicant: Nissan North America, Inc., Franklin, TN (US)

(72) Inventor: Kyle Happy, Whitmore Lake, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 258 days.

(21) Appl. No.: 16/670,806

(22) Filed: Oct. 31, 2019

(65) Prior Publication Data

US 2021/0129756 A1 May 6, 2021

(51) Int. Cl.
  *B60R 1/12* (2006.01)
  *B60R 1/072* (2006.01)

(52) U.S. Cl.
  CPC ............... *B60R 1/12* (2013.01); *B60R 1/072* (2013.01); *B60R 2001/1223* (2013.01)

(58) Field of Classification Search
  CPC B60R 1/072; B60R 1/074; B60R 1/12; B60R 2001/1223
  USPC ........................................ 359/872, 877, 841
  See application file for complete search history.

(56) References Cited

U.S. PATENT DOCUMENTS

| | | | | |
|---|---|---|---|---|
| 1,386,959 A * | 8/1921 | Severance | ................. | B60R 1/04 224/558 |
| 3,609,014 A * | 9/1971 | Kurz, Jr. | ................. | B60R 1/072 359/874 |
| 4,256,375 A * | 3/1981 | Sharp | ................. | B60R 1/07 359/877 |
| 6,755,543 B1 * | 6/2004 | Foote | ................. | B60R 1/078 359/872 |
| 7,044,612 B2 * | 5/2006 | Centmayer | ........... | B60R 1/0612 359/881 |
| 7,445,392 B2 * | 11/2008 | Straehle | ................. | B60R 1/002 396/419 |
| 7,490,946 B1 * | 2/2009 | Foote | ................. | B60R 1/06 248/478 |
| 8,915,601 B2 * | 12/2014 | Foote | ................. | B60R 1/062 359/876 |
| 10,336,260 B1 * | 7/2019 | Salter | ................. | B60R 3/002 |
| 2002/0048100 A1 * | 4/2002 | Hoek | ................. | B60R 1/076 248/479 |
| 2004/0121820 A1 * | 6/2004 | Unno | ................. | B60R 1/06 455/569.2 |
| 2006/0078325 A1 * | 4/2006 | Straehle | ................. | B60R 1/002 396/419 |
| 2009/0284599 A1 * | 11/2009 | Wagner | ................. | B60R 1/00 348/148 |
| 2014/0063233 A1 * | 3/2014 | Henion | ................. | B60R 1/003 348/118 |
| 2014/0092495 A1 * | 4/2014 | Bowers | ................. | B60R 11/04 359/841 |
| 2017/0210297 A1 * | 7/2017 | Kim | ................. | B60R 1/12 |
| 2017/0259753 A1 * | 9/2017 | Meyhofer | ............ | H04N 13/204 |
| 2018/0032822 A1 * | 2/2018 | Frank | ................. | B60R 1/12 |

(Continued)

*Primary Examiner* — Ricky D Shafer
(74) *Attorney, Agent, or Firm* — Global IP Counselors, LLP

(57) ABSTRACT

A vehicle side mirror assembly includes a base member configured to be attached to a vehicle. A sensor is non-rotatably attached to the base member. A mirror housing is connected to the base member. An actuator is disposed within the mirror housing. A mirror assembly is connected to the actuator such that movement of the actuator controls a position of the mirror assembly.

14 Claims, 4 Drawing Sheets

(56) References Cited

U.S. PATENT DOCUMENTS

| | | |
|---|---|---|
| 2018/0329036 A1 | 11/2018 | Huebner et al. |
| 2018/0354422 A1* | 12/2018 | Hottmann ............. B60R 1/1207 |
| 2019/0047473 A1* | 2/2019 | Pohl ....................... G08G 1/166 |
| 2020/0353867 A1* | 11/2020 | Huizen .................... B60R 1/12 |
| 2021/0031692 A1* | 2/2021 | Ning .................... G01S 7/4813 |

* cited by examiner

US 11,465,562 B2

VEHICLE SIDE MIRROR ASSEMBLY

BACKGROUND

Field of the Invention

The present invention generally relates to a vehicle side mirror assembly. More specifically, the present invention relates to vehicle side mirror assembly in which a mirror glass is adjustable without moving a sensor disposed in a mirror housing.

Background Information

Conventional vehicle side mirror assemblies often do not include an internal sensor that detects information regarding the surrounding environment in which the vehicle is operating. Vehicle side mirror assemblies that do include such an internal sensor typically have a mirror glass that is not adjustable.

SUMMARY

An object of the disclosure is to provide a vehicle side mirror assembly including a sensor disposed in a mirror housing in which a mirror glass is adjustable without moving the sensor.

In view of the state of the known technology, one aspect of the present disclosure is to provide a vehicle side mirror assembly including a base member configured to be attached to a vehicle. A sensor is non-rotatably attached to the base member. A mirror housing is connected to the base member. An actuator is disposed within the mirror housing. A mirror assembly is connected to the actuator such that movement of the actuator controls a position of the mirror assembly.

Another aspect of the present invention includes a vehicle side mirror assembly including a base member configured to be attached to a vehicle. A sensor is non-rotatably attached to the base member. A mirror housing is rigidly connected to the base member. An actuator is disposed within the mirror housing. A mirror assembly is connected to the actuator such that movement of the actuator controls a position of the mirror assembly. The actuator is disposed lower than the mirror assembly in the mirror housing.

Another aspect of the present invention includes a vehicle side mirror assembly including a base member configured to be attached to a vehicle. A sensor is non-rotatably attached to the base member. An actuator is disposed within the mirror housing. A mirror housing is movably connected to the base member and directly connected to the actuator such that movement of the actuator moves the mirror housing relative to the base member. A mirror assembly is connected to the mirror housing such that the mirror assembly moves with the mirror housing.

Also other objects, features, aspects and advantages of the disclosed vehicle side mirror assembly will become apparent to those skilled in the art from the following detailed description, which, taken in conjunction with the annexed drawings, discloses exemplary embodiments of the vehicle side mirror assembly.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
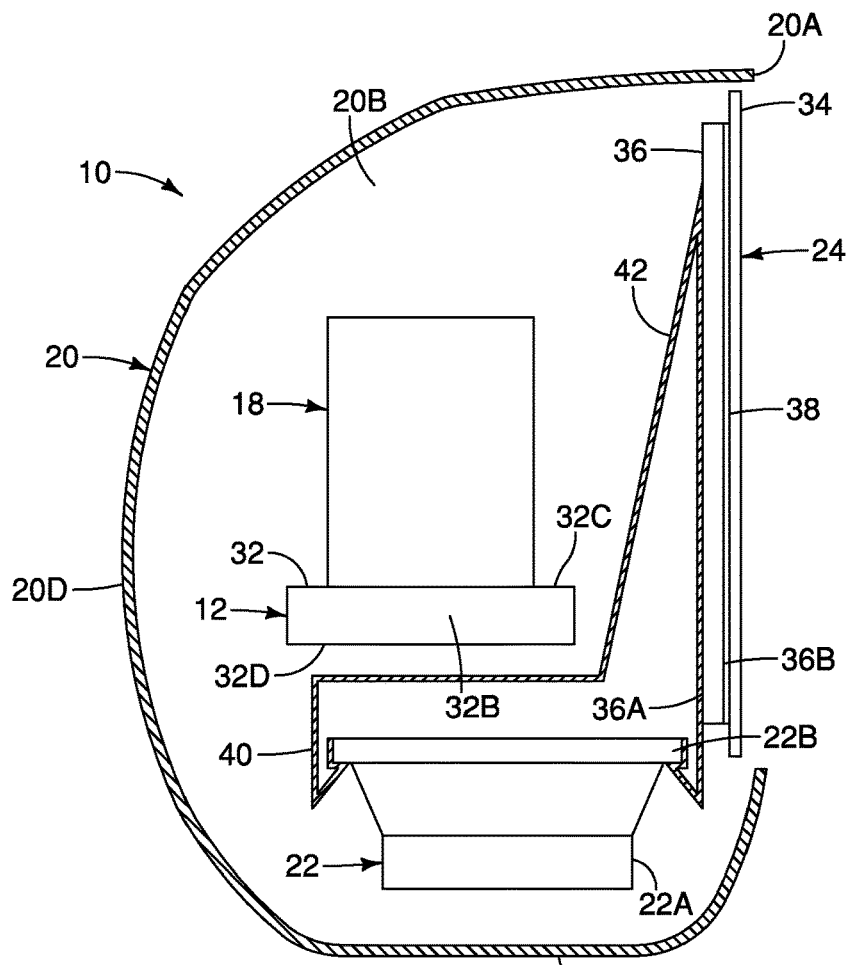
FIG. 1 is a schematic illustration of a vehicle side mirror assembly in accordance with an exemplary embodiment of the present invention.

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Referring initially to FIGS. 1-3 and 8, a vehicle side mirror assembly 10 is illustrated in accordance with an exemplary embodiment of the present invention. The vehicle side mirror assembly 10 includes a base member 12 configured to be attached to a vehicle 14, such as to a door panel 16 of the vehicle 14. A sensor 18 is non-rotatably attached to the base member 12. A mirror housing 20 is connected to the base member 12. An actuator 22 is disposed within the mirror housing 20. A mirror assembly 24 is connected to the actuator 22 such that movement of the actuator 22 controls a position of the mirror assembly 24.

Figure 2:
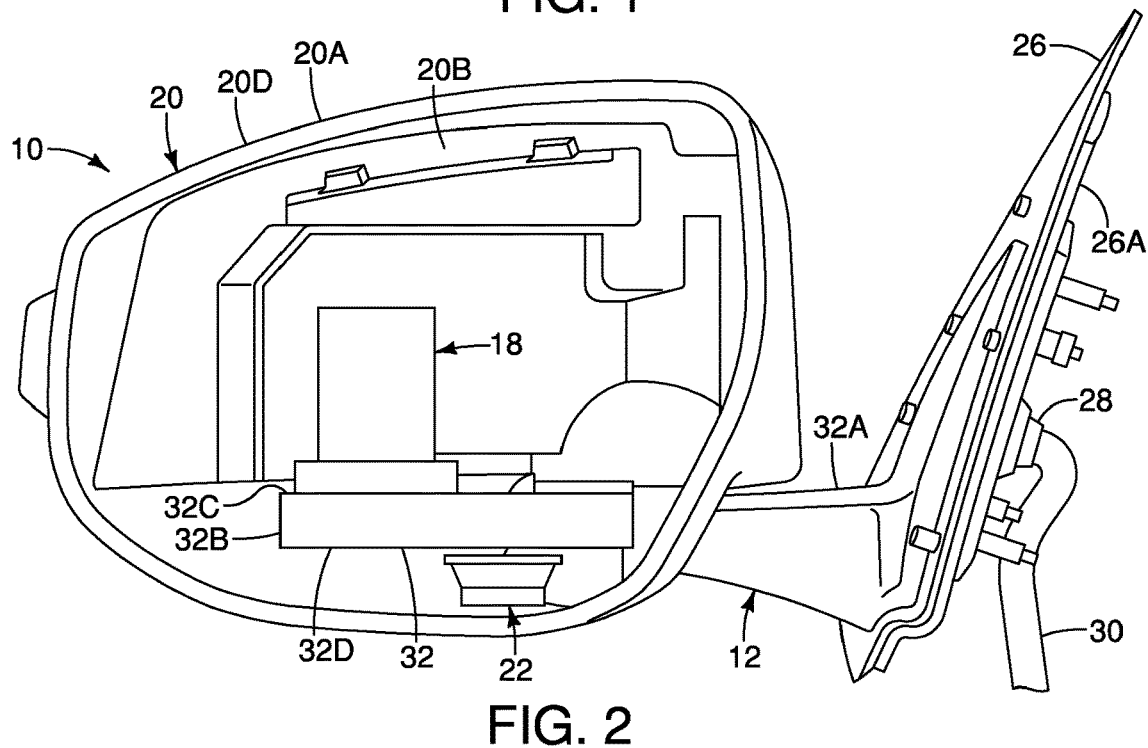
FIG. 2 is an elevational view in cross section of a vehicle side mirror assembly in accordance with the exemplary embodiment of FIG. 1.
Figure 8:
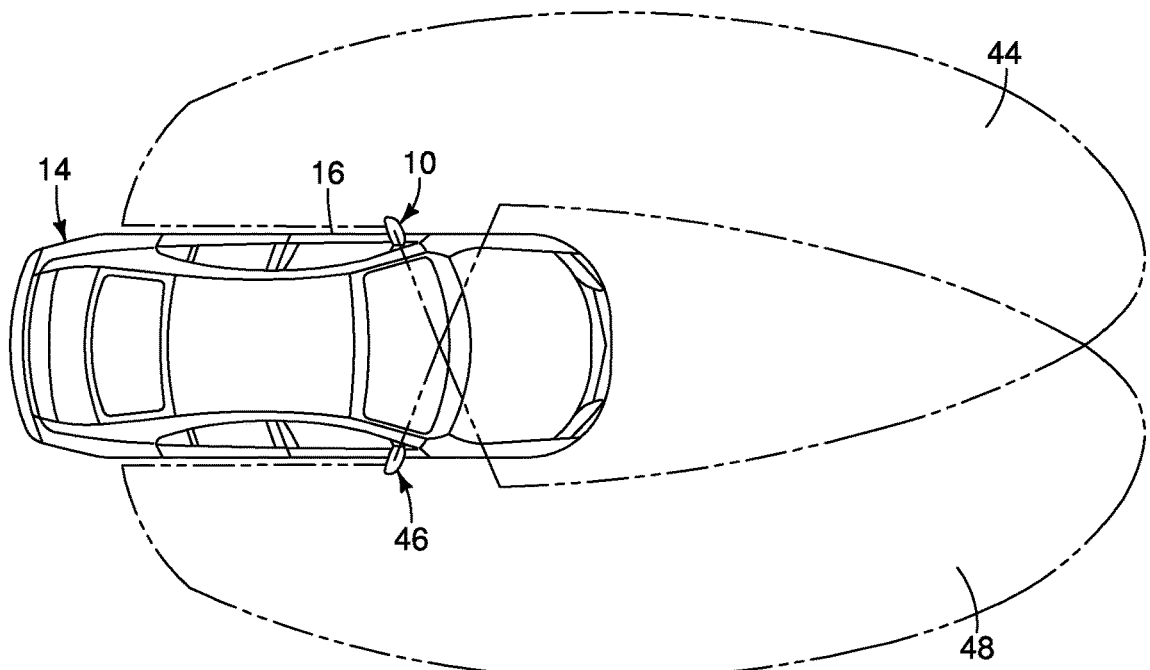
FIG. 8 is a schematic illustration of a field of view of a sensor of the vehicle side mirror assembly of the exemplary embodiments of FIGS. 1-7.

The base member 12 includes a mounting portion 26 that mounts the vehicle side mirror assembly 10 the vehicle, as shown in FIGS. 2 and 8. A plurality of fasteners secure the mounting portion 26 to the vehicle 14. An opening 28 in an inboard surface 26A of the mounting portion 26 receives electrical wiring 30. The electrical wiring 30 electrically connects the actuator 22 to an operating member disposed within a vehicle cabin such that the orientation of the mirror assembly 24 is controllable from within the vehicle cabin. The electrical wiring 30 supplies electrical power and control signals to the vehicle side mirror assembly 10. The mirror assembly 24 is movable with respect to the base member 12 responsive to the received power and control signals.

A support portion 32 of the base member 12 extends outwardly from the mounting portion 26, as shown in FIG. 2. The support portion 32 has an internal passageway for routing the electrical wiring 30 therethrough. A first end 32A of the support portion 32 is connected to the mounting portion 26. A second end 32B of the support portion 32 is a free end and is spaced from the first end 32A. The support portion 32 has an upper surface 32C and an oppositely disposed lower surface 32D. The lower surface 32D faces toward the ground when the vehicle side mirror assembly 10 is mounted to the vehicle 14.

The sensor 18 is non-rotatably attached to the base member 12, as shown in FIGS. 1 and 2. The sensor 18 is configured to detect information about the environment in which the vehicle 14 is operating. Any suitable sensor 18 can be used, such as a light detection and ranging sensor (LIDAR). Maintaining the orientation of the sensor 18 is necessary for accurate information to be sensed by the sensor 18. The sensor 18 is rigidly fixed to the support portion 32 of the base member 12 such that the sensor 18 does not move relative thereto. In other words, the sensor 18 does not move on the support portion 32 of the base member 12. The sensor 18 is rigidly fixed to the upper surface 32C of the support portion 32 of the base member 12. The electrical wiring 30 passes through the support portion 32 to the sensor 18 to enable signals to be transmitted between the sensor 18 and an electronic control unit (ECU) disposed within the vehicle.

The mirror housing 20 has a perimeter 20A defining a cavity 20B, as shown in FIGS. 1 and 2. A wall 20C extends outwardly from the perimeter 20A to form an open-faced mirror housing 20 having a closed rear surface 20D. An opening 20E in the wall 20C receives the support portion 32 of the base member 12, as shown in FIG. 2.

The actuator 22 is disposed within the mirror housing 20, as shown in FIGS. 1 and 2. The actuator 22 includes a fixed member 22A and a movable member 22B that is movable relative to the fixed member 22A. The fixed member 22A is movably connected to the fixed member 22A in any suitable manner such that the movable member 22B can be moved to any desired position relative to the fixed member 22A. The electrical wiring 30 passes through the support portion 32 to a motor, or other suitable component, connected to the fixed member 22A to control the position of the movable member 22B.

The mirror assembly 24 is connected to the actuator 22 such that movement of the actuator 22 controls the position of the mirror assembly 24. The mirror assembly 24 includes a mirror glass 34 that is connected to a support member 36, such as a backing plate, as shown in FIG. 1. The support member 36 has an inner surface 36A and an outer surface 36B. The inner surface 36A faces the cavity 20B of the mirror housing 20. The outer surface 36B faces in an opposite direction from the inner surface 36A and away from the cavity 20B of the mirror housing 20. The mirror glass 34 can be secured to the support member 36 in any suitable manner, such as with an adhesive 38, to substantially prevent movement of the mirror glass relative to the support member 36. The mirror glass 34 is connected to the outer surface 36B of the support member 36.

Figure 3:
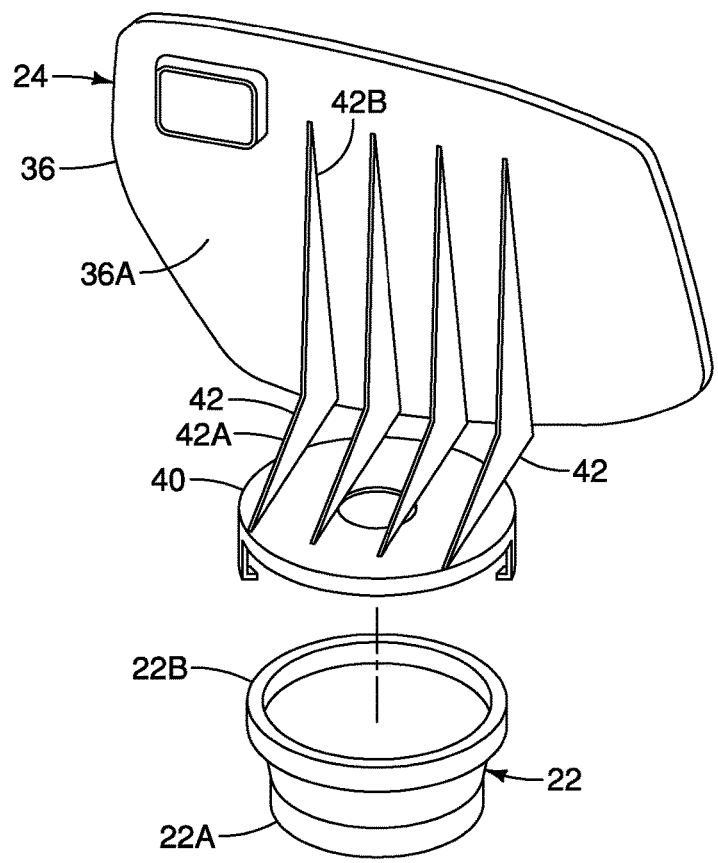
FIG. 3 is an exploded assembly view of a mirror assembly and an actuator of the vehicle side mirror assembly of FIG. 1.

The mirror assembly 24 includes a mounting member 40 that connects the mirror assembly 24 to the actuator 22, as shown in FIGS. 1 and 3. The mounting member 40 is connected to the actuator 22 in any suitable manner such that movement of the actuator moves the mirror assembly 24. A connecting member 42 of the mirror assembly 24 is connected to the support member 40. The connecting member 42 can be any suitable structure to rigidly connect the mounting member 40 to the support member 36. As shown in FIG. 3, the connecting member 42 is a substantially L-shaped rib having a first leg 42A connected the mounting member 40 and a second leg 42B connected to an outboard surface 36A of the support member 36. As shown in FIG. 1, the connecting member 42 connects the mounting member 40 to the support member 36 such that the support member 36 is disposed substantially perpendicularly to the mounting member 40. Preferably, the connecting member 42 is integrally formed as a one-piece member. More preferably, support member 36, the mounting member 40 and the connecting member 42 of the mirror assembly 24 are integrally formed as a one-piece member. As shown in FIG. 3, four connecting members 42 are used to connect the mounting member 40 to the support member 36, although any suitable number of connecting members 42 can be used.

The mirror assembly 24 is directly connected to the mirror housing 20. The mirror assembly 24 can be fixedly connected to the mirror housing 20 such that the mirror housing 20 moves with movement of the mirror assembly 24, or the mirror assembly 24 can be movably connected to the mirror housing 20 such that the mirror assembly 20 moves relative to the mirror housing 20. The support member 36 of the mirror assembly 24 is connected to the mirror housing 20, as shown in FIG. 1. The support member 36 is disposed in the open-face of the mirror housing 20 such that the support member 36 covers the cavity 20B of the mirror housing 20.

As shown in FIG. 1, the mirror assembly 24 is directly connected to the actuator 22 such that movement of the movable member 22B of the actuator 22 directly moves the mirror glass 34. The mirror assembly 24 is rigidly fixed to the mirror housing 20 such that the mirror housing 20 moves with movement of the mirror assembly 24. In other words, adjusting the position of the mirror glass 34 of the mirror housing 24 results in movement of the mirror housing 20. The opening 20E in the mirror housing 20 is configured to allow movement of the mirror housing 20 relative to the support portion 32 of the base member 12.

Alternatively, the mirror assembly 24 is movably connected to the mirror housing 20, such that the mirror housing 20 does not move with movement of the mirror assembly 24. The movable connection between the mirror assembly 24 and the mirror housing 20 allows the actuator 22 to move the mirror assembly 24 without moving the mirror housing 20.

As shown in FIGS. 1 and 2, the actuator 22 is disposed in the mirror housing 20 in a substantially horizontal position. Preferably, the actuator 22 is disposed lower than the mirror assembly 24. The actuator 22 is disposed lower than the sensor 18 and the supporting portion 32 of the base member 12. The mounting member 40 is disposed lower than the sensor 18 in the mirror housing 20.

Non-movably disposing the sensor 18 relative to the support portion 32 of the base member 12 provides a first coverage area as shown in FIG. 8. A second vehicle side mirror assembly 46 is disposed on the passenger side of the vehicle 14 providing a second coverage area 48 as shown in FIG. 8. The second vehicle side mirror assembly 46 is substantially similar to the vehicle side mirror assembly 10 except for being disposed on the passenger side of the vehicle 14 instead of the driver side of the vehicle 14. The first and second coverage areas 44 and 48 extend from a position disposed rearwardly of the respective vehicle side mirror assemblies alongside the vehicle 14 to a position disposed forward of the opposite vehicle side mirror assembly. Increased coverage areas 44 and 48 are provided by the vehicle side mirror assemblies 10 and 46 in accordance with the exemplary embodiments of the present invention. The actuator 22 being disposed below the sensor 18 allows does not interfere with the visibility of the sensor 18, thereby proving full sensor visibility while maintaining adjustability of the mirror assembly 24.

Figure 4:
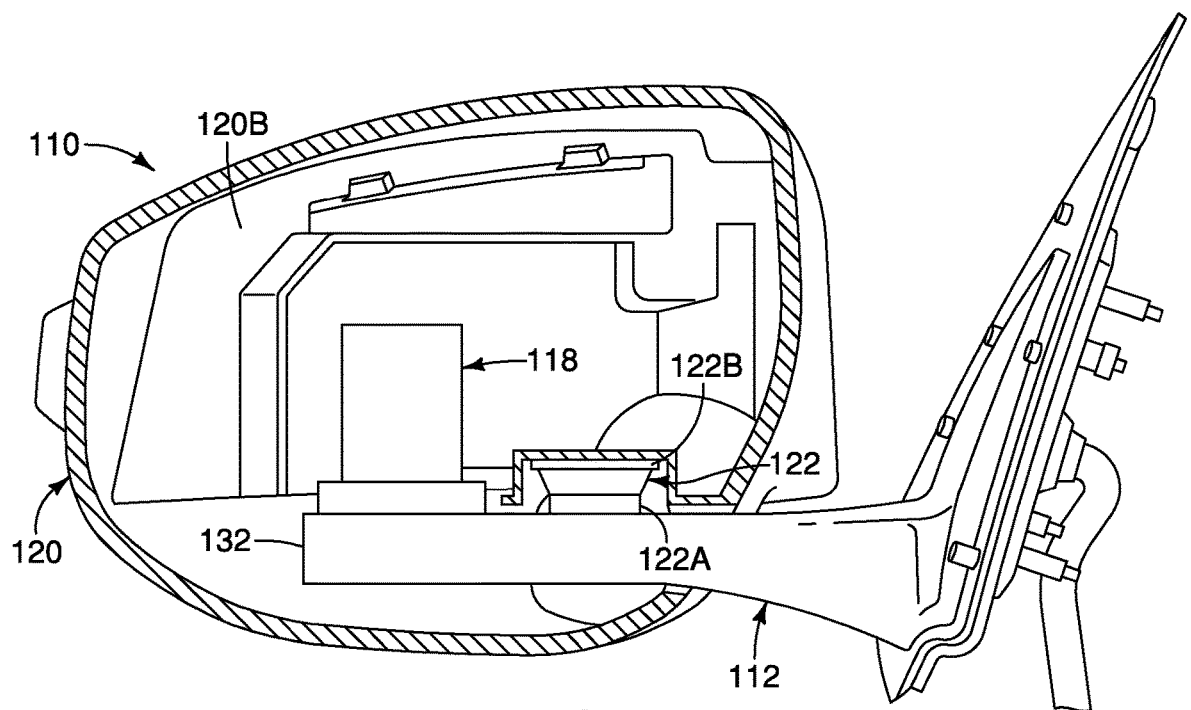
FIG. 4 is a schematic illustration of a vehicle side mirror assembly in accordance with another exemplary embodiment of the present invention.
Figure 5:
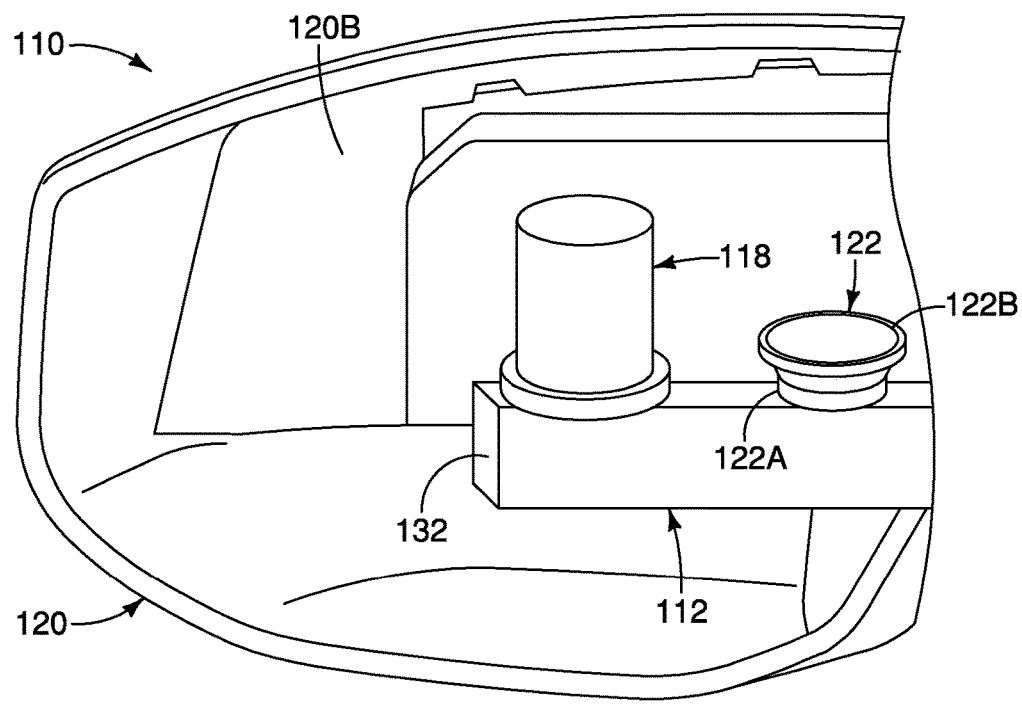
FIG. 5 is an elevational view in cross section of a vehicle side mirror assembly in accordance with the exemplary embodiment of FIG. 4.

Another exemplary embodiment of the vehicle side mirror assembly 110 is shown in FIGS. 4 and 5. The features of the vehicle side mirror assembly 110 of FIGS. 4 and 5 that are substantially similar to the features of the vehicle side mirror assembly 110 of FIGS. 1-3 are provided the same reference numerals as the features of the vehicle side mirror assembly 10 except in the 100 series (i.e., 1xx). Moreover, the descriptions of the parts of the vehicle side mirror assembly 110 of FIGS. 4 and 5 that are identical to the vehicle side mirror assembly 10 of FIGS. 1-3 are omitted for the sake of brevity.

As shown in FIGS. 4 and 5, the actuator 122 is disposed on an inboard side of the sensor 118 on the support portion 132 of the base member 112. The actuator 122 is disposed in a substantially horizontal position. The actuator 122 is disposed above the support portion 132 of the base member 112. A fixed portion 122A of the actuator 122 is fixed to the support portion 132. A movable portion 122B of the actuator 122 is directly connected to the mirror housing 120. The mirror housing 120 is movably connected to the base member 112. The sensor 118 and the actuator 122 are disposed within the mirror housing 120B.

The mirror housing 120 is directly connected to the actuator 122 such that movement of the actuator 122 moves the mirror housing 120 relative to the base member 112. The mirror assembly 24 (FIGS. 1 and 3) is connected to the mirror housing 120 such that the mirror assembly 24 moves with the mirror housing 120.

Figure 6:
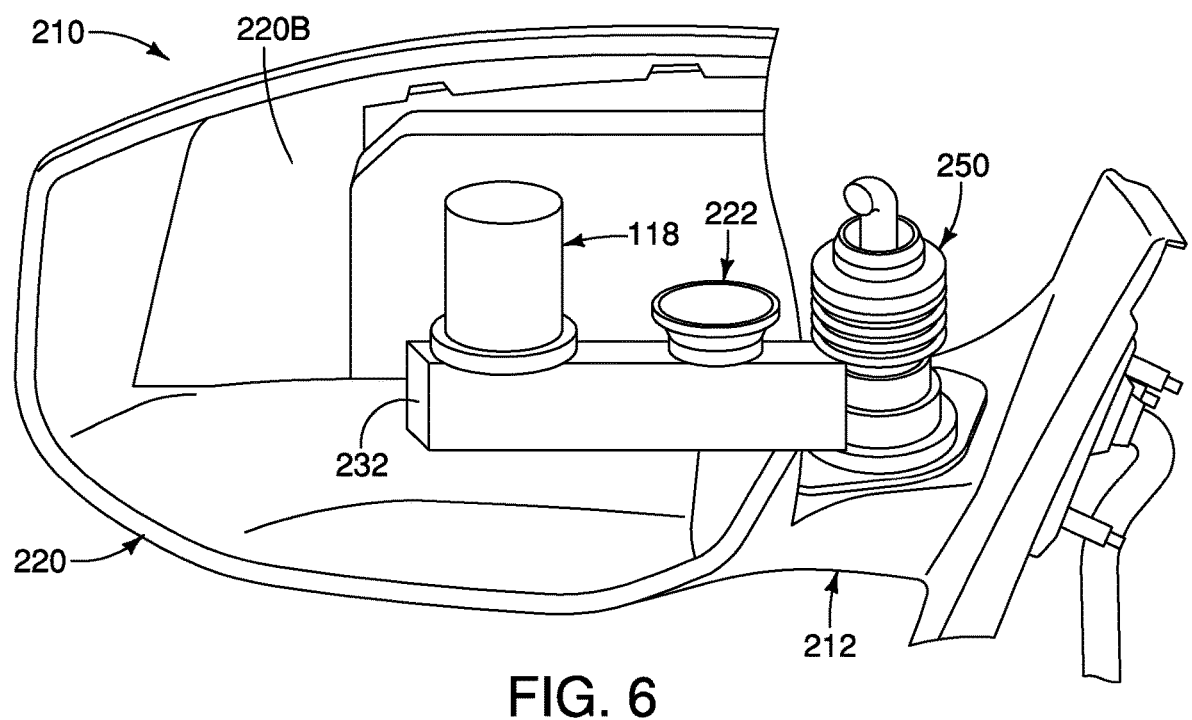
FIG. 6 is a schematic illustration of a vehicle side mirror assembly in accordance with still another exemplary embodiment of the present invention.

Another exemplary embodiment of the vehicle side mirror assembly 210 is shown in FIG. 6. The features of the vehicle side mirror assembly 210 of FIG. 6 that are substantially similar to the features of the vehicle side mirror assembly 10 of FIGS. 1-3 are provided the same reference numerals as the features of the vehicle side mirror assembly 10 except in the 200 series (i.e., 2xx). Moreover, the descriptions of the parts of the vehicle side mirror assembly 210 of FIG. 6 that are identical to the vehicle side mirror assembly 10 of FIGS. 1-3 are omitted for the sake of brevity.

As shown in FIG. 6, the vehicle side mirror assembly 210 includes a conventional folding mechanism 250 that pivots the mirror housing 220 between an operated position and a folded position. The operated position is a position of the mirror housing 220 spaced outwardly from the vehicle when the vehicle is being operated. The folded position is a position in which the mirror housing 220 is in position adjacent the vehicle to reduce an overall width of the vehicle.

The support portion 232 is a folding bracket on which the sensor 218 and the actuator 222 are disposed. The folding mechanism 250 moves the folding bracket 232 between the operated and folded positions. The folding bracket 232 is connected to the base member 212 via the folding mechanism 250 to pivot the mirror housing 220 toward and away from the vehicle. The sensor 218 and the actuator 222 are disposed within the mirror housing 220.

The mirror assembly 24 (FIGS. 1 and 3) is connected to the actuator 222 similarly to the mirror assembly 24 of FIGS. 1-3. Movement of the actuator 222 moves the mirror assembly 24 to a desired position through movement of the mirror housing 220. In other words, the actuator moves the mirror housing 220 to which the mirror assembly 24 is fixedly connected. Alternatively, the mirror assembly 24 can be movably connected to the mirror housing 220 such that movement of the mirror assembly 24 does not move the mirror housing 220. In other words, the mirror assembly 24 is movable relative to the mirror housing 220.

Figure 7:
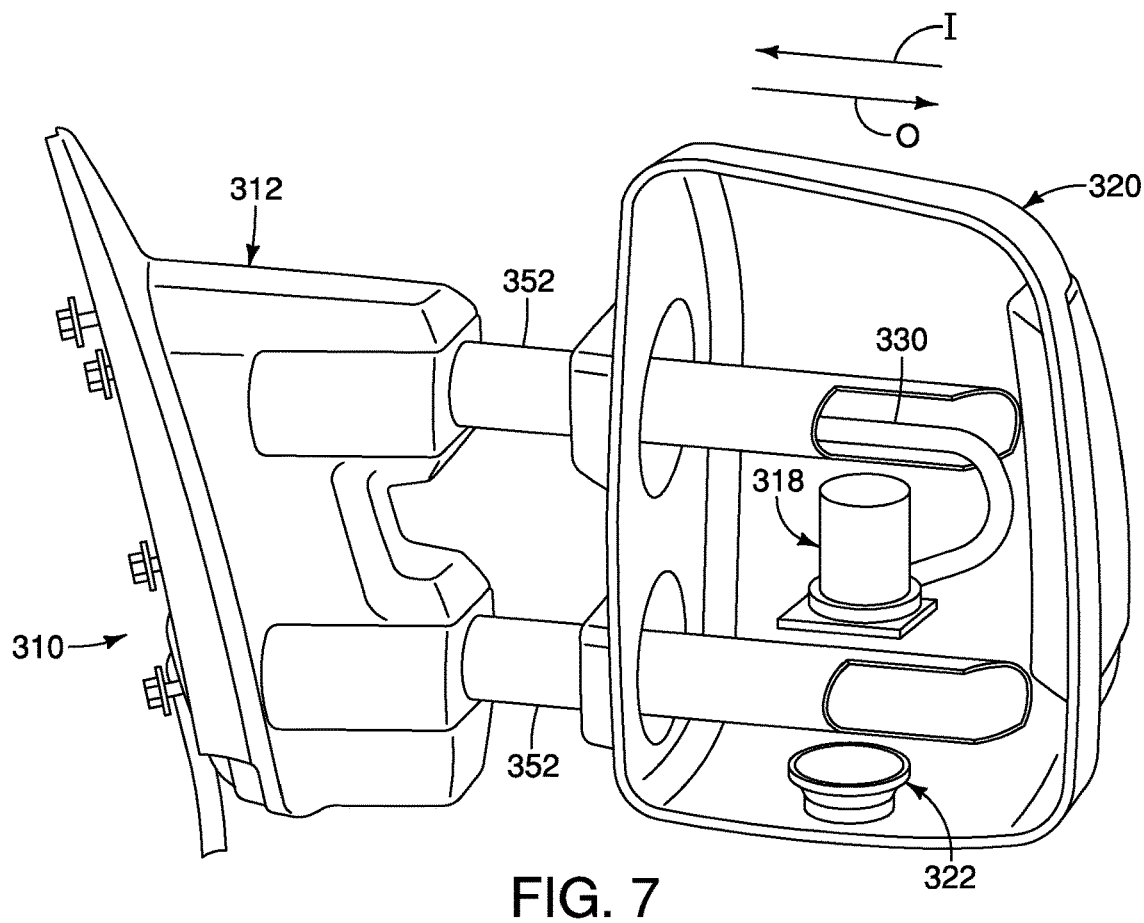
FIG. 7 is a schematic illustration of a vehicle side mirror assembly in accordance with yet another exemplary embodiment of the present invention.

Another exemplary embodiment of the vehicle side mirror assembly 310 is shown in FIG. 7. The features of the vehicle side mirror assembly 310 of FIG. 7 that are substantially similar to the features of the vehicle side mirror assembly 10 of FIGS. 1-3 are provided the same reference numerals as the features of the vehicle side mirror assembly 10 except in the 300 series (i.e., 3xx). Moreover, the descriptions of the parts of the vehicle side mirror assembly 310 of FIG. 7 that are identical to the vehicle side mirror assembly 10 of FIGS. 1-3 are omitted for the sake of brevity.

As shown in FIG. 7, the mirror housing 320 is movably connected to the base member 312. The mirror housing 320 is movable in an outboard direction O and an inboard direction I relative to the vehicle. The sensor 318 is fixedly mounted within the mirror housing 320 such that the sensor 318 does not move relative to the mirror housing 320. An actuator 322 is disposed within the mirror housing 320 to adjust the position of the mirror assembly 24 as described above with reference to the exemplary embodiments illustrated in FIGS. 1-6.

A support arm 352 movably connects the mirror housing 320 to the base member 312. The support arm 352 can be hollow to provide a passage for the electrical wiring 330 to the sensor 318 and the actuator 22 (FIG. 1). Two support arms 352 movably connect the mirror housing 320 to the base member 312, although any suitable number of support arms 352 can be used.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle side mirror assembly. Accordingly, these terms, as utilized to describe the present invention should be interpreted relative to a vehicle equipped with the vehicle side mirror assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle side mirror assembly comprising:
a base member configured to be attached to a vehicle;
a sensor non-rotatably attached to the base member;
a mirror housing connected to the base member;
an actuator disposed within the mirror housing; and
a mirror assembly connected to the actuator such that movement of the actuator controls a position of the mirror assembly, the mirror assembly including
a mounting member connected to the actuator,
a support member connected to the mounting member, and
a mirror glass connected to the support member, the support member being disposed substantially perpendicularly to the mounting member,
the sensor being entirely disposed within a cavity defined by the mirror housing and the mirror assembly.

2. The vehicle side mirror assembly according to claim 1, wherein
the mirror assembly is directly connected to the actuator.

3. The vehicle side mirror assembly according to claim 2, wherein
the mirror assembly is movably connected to the mirror housing such that the mirror housing does not move with movement of the mirror assembly.

4. The vehicle side mirror assembly according to claim 1, wherein
the actuator is disposed in a substantially horizontal position.

5. The vehicle side mirror assembly according to claim 1, wherein
the actuator is disposed lower than the mirror assembly.

6. The vehicle side mirror assembly according to claim 1, wherein
the sensor is a light detecting and ranging sensor.

7. The vehicle side mirror assembly according to claim 1, wherein
a folding bracket is connected to the base member to pivot the mirror housing toward and away from the vehicle, the actuator and the sensor being disposed on the folding bracket.

8. The vehicle side mirror assembly according to claim 7, wherein
the mirror assembly is movably connected to the mirror housing such that the mirror housing does not move with movement of the mirror assembly.

9. The vehicle side mirror assembly according to claim 1, wherein
the mirror housing is movable in an outboard direction and an inboard direction relative to the vehicle.

10. The vehicle side mirror assembly according to claim 1, wherein
a plurality of connecting members connect the support member to the mounting member.

11. The vehicle side mirror assembly according to claim 1, wherein
the mounting member is disposed lower than the sensor in the mirror housing.

12. A vehicle side mirror assembly comprising:
a base member configured to be attached to a vehicle;
a sensor non-rotatably attached to the base member;
a mirror housing rigidly connected to the base member;
an actuator disposed within the mirror housing; and
a mirror assembly connected to the actuator such that movement of the actuator controls a position of the mirror assembly, the actuator being disposed lower than the mirror assembly in the mirror housing.

13. The vehicle side mirror assembly according to claim 12, wherein
the actuator is disposed in a substantially horizontal position.

14. A vehicle side mirror assembly comprising:
a base member configured to be attached to a vehicle;
a sensor non-rotatably attached to the base member;
a mirror housing connected to the base member;
an actuator disposed within the mirror housing; and
a mirror assembly connected to the actuator such that movement of the actuator controls a position of the mirror assembly, the mirror assembly including
a mounting member connected to the actuator, the mounting member being disposed lower than the sensor in the mirror housing,
a support member connected to the mounting member, and
a mirror glass connected to the support member,
the sensor being entirely disposed within a cavity defined by the mirror housing and the mirror assembly.

* * * * *